(12) United States Patent
Teoh et al.

(10) Patent No.: US 12,354,354 B1
(45) Date of Patent: Jul. 8, 2025

(54) DEVICE AND METHOD FOR COLLABORATION BETWEEN DIFFERENT AGENCIES FOR CLASSIFYING AN EVENT CAPTURED IN A VIDEO STREAM

(71) Applicant: MOTOROLA SOLUTIONS, INC., Chicago, IL (US)

(72) Inventors: Wooi Ping Teoh, Georgetown (MY); Wei Lun Chan, Simpang Ampat (MY); Tejeash Duraimanickam, Lunas (MY); Chun Wen Ooi, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/609,503

(22) Filed: Mar. 19, 2024

(51) Int. Cl.
*G06V 20/40* (2022.01)
*G06F 16/787* (2019.01)
*G06V 10/764* (2022.01)
*G06V 20/52* (2022.01)

(52) U.S. Cl.
CPC ............ *G06V 20/44* (2022.01); *G06F 16/787* (2019.01); *G06V 10/764* (2022.01); *G06V 20/52* (2022.01)

(58) Field of Classification Search
CPC ...... G06V 20/44; G06V 10/764; G06V 20/52; G06F 16/787
USPC ......................................................... 348/143
See application file for complete search history.

(56) References Cited

U.S. PATENT DOCUMENTS 10,388,132 B2 8/2019 Cutcher et al.
11,881,027 B1* 1/2024 Ghani ............... G08B 13/19613
2011/0109742 A1 5/2011 Laganiere et al.
2020/0364468 A1 11/2020 Sulzer et al.
2022/0337902 A1* 10/2022 Tian ........................ G06V 20/52
2023/0004654 A1* 1/2023 Jurzak ..................... G06N 20/20

(Continued)

FOREIGN PATENT DOCUMENTS

DE 102012217145 A1 3/2014
DE 102021213211 A1 5/2023

(Continued)

OTHER PUBLICATIONS

The International Search Report and the Written Opinion corresponding patent application serial No. PCT/US2025/017462 filed: Feb. 27, 2025, mailed 29, Apr. 2025, all pages.

*Primary Examiner* — Susan E. Hodges
(74) *Attorney, Agent, or Firm* — Raguraman Kumaresan

(57) ABSTRACT

A process of collaboration between different agencies for classifying an event captured in a video stream. In operation, a video stream captured by a camera operated by a public-safety agency is analyzed using a first video analytics engine trained using a first set of video analytics data associated with the public-safety agency and an abnormal event with respect to a person or object captured in the video stream is detected. When it is determined that the video stream is captured at a location that is proximity to an operating environment of a non-public-safety agency, a query is transmitted to a second video analytics engine trained using a second set of video analytics data associated with the non-public-safety agency. The abnormal event is reclassified as a normal event when a response from the second video analytics engine indicates that the abnormal event is normal within the operating environment of the non-public-safety agency.

20 Claims, 6 Drawing Sheets

(56) References Cited

U.S. PATENT DOCUMENTS

2023/0297541 A1     9/2023   Boutell et al.
2025/0111673 A1*    4/2025   Rao ........................ G06V 20/44

FOREIGN PATENT DOCUMENTS

IN      201831007200 A    8/2019
WO         2021072645 A1  4/2021

* cited by examiner

DEVICE AND METHOD FOR COLLABORATION BETWEEN DIFFERENT AGENCIES FOR CLASSIFYING AN EVENT CAPTURED IN A VIDEO STREAM

BACKGROUND

The use of video surveillance systems across public safety and enterprise markets continues to grow. Many state and local public-safety agencies already mandate or encourage officers to use camera-enabled devices such as dashboard cameras, body worn cameras, or drones during the course of their duties. Enterprises such as banks, retail stores etc., also widely use video surveillance systems to monitor anomalies in their operating environments. Information captured using video surveillance systems is monitored by a human operator in real time and/or recorded and reviewed later by a human operator. Since manually screening large amounts of information captured by video surveillance systems is a tedious process for operators, agencies are increasingly relying on video analytics solutions to automatically analyze information captured by video surveillance systems and alert operators when abnormal events are detected.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
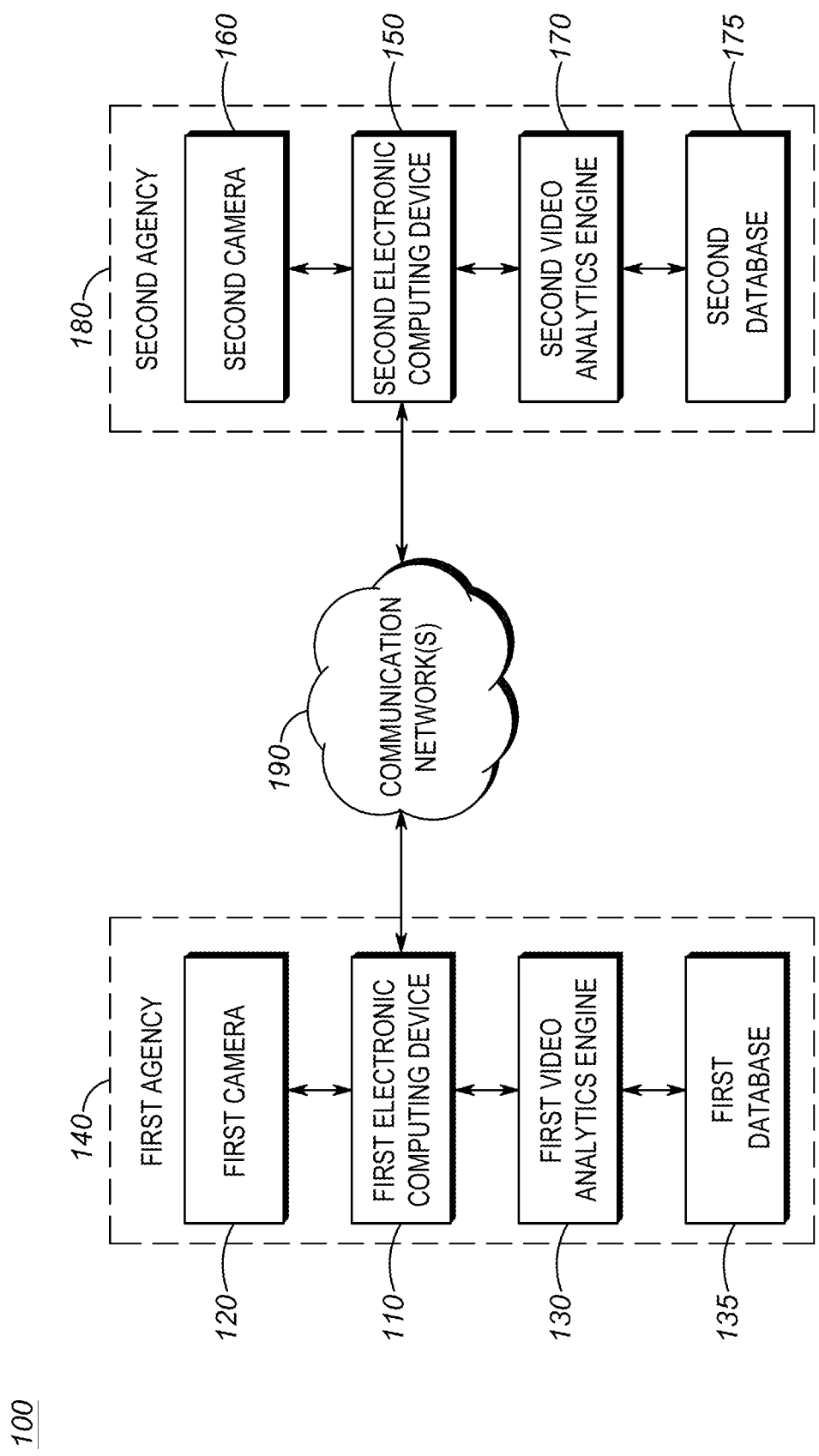
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Public safety personnel such as police often patrol areas in which enterprises and facilities (also referred herein as non-public-safety agencies) such as banks, retail stores, airports, schools, religious centers etc., conduct their operations. Public-safety personnel use cameras such as drones, dashboard cameras, body worn cameras etc., to monitor areas being patrolled and to receive alerts about abnormal events detected in video streams captured corresponding to the monitored areas. Video analytics systems may be employed by public-safety agencies to automatically analyze video streams captured corresponding to monitored areas and to detect abnormal events from the video streams. However, a classification of an event (e.g., as an abnormal event) may not always be accurate since video analytics systems employed by public-safety agencies are often trained using a limited set of data, for example, data that were captured and/or received from data sources particularly operated and/or maintained by public-safety agencies. In other words, video analytics systems employed by public-safety agencies may not have access to data captured by non-public-safety agencies such as a bank or a retail store. For example, a video analytics system associated with a public-safety agency may detect a person standing or waiting idly near a bank and may classify this event as an abnormal event. However, the person could be a regular customer of the bank. In this case, since the video analytics system associated with the public-safety agency does not have access to enterprise data indicating that the person is a regular customer, the video analytics system may not accurately classify the event. Such inaccurate classification of events may result in public-safety actions such as investigation, interrogation, or arrest based on alerts received from the video analytics system. Any public-safety response without further verifying the classification of an event reported by video analytics systems may lead to unintended consequences including misidentification of suspects, wrongful arrests, biased enforcement, and strained community relations.

To address the above limitations of existing video analytics solutions, there is a need for a technological solution that involves collaboration between different agencies for classifying an event captured in a video stream. More particularly, collaboration between video analytics systems associated with public-safety and non-public-safety agencies would improve accuracy of classification of events detected in video streams captured by public-safety agencies and further avoid unintended consequences associated with public-safety responses resulting from inaccurate classification of events.

One embodiment provides a method of collaboration between different agencies for classifying an event captured in a video stream. The method comprises: receiving, at an electronic computing device, a video stream captured by a camera operated by a public-safety agency; analyzing, at the electronic computing device, the video stream using a first video analytics engine trained using a first set of video analytics data associated with the public-safety agency; detecting, at the electronic computing device, an abnormal event with respect to a person or object captured in the video stream based on the analysis of the video stream using the first video analytics engine; determining, at the electronic computing device, that the video stream is captured corresponding to a location that is in proximity to an operating environment of a non-public-safety agency; transmitting, at the electronic computing device, to a second video analytics engine trained using a second set of video analytics data associated with the non-public-safety agency, a query to confirm whether the abnormal event detected by the first video analytics engine with respect to the person or object captured in the video stream is normal or abnormal within the operating environment of the non-public-safety agency;

and reclassifying the abnormal event as a normal event when a response from the second video analytics engine indicates that the abnormal event detected by the first video analytics engine is normal within the operating environment of the non-public-safety agency.

Another embodiment provides an electronic computing device, comprising: a communications interface; and an electronic processor communicatively coupled to the communications interface. The electronic processor is configured to: receive, via the communications interface, a video stream captured by a camera operated by a public-safety agency; analyze the video stream using a first video analytics engine trained using a first set of video analytics data associated with the public-safety agency; detect an abnormal event with respect to a person or object captured in the video stream based on the analysis of the video stream using the first video analytics engine; determine that the video stream is captured corresponding to a location that is in proximity to an operating environment of a non-public-safety agency; transmit, to a second video analytics engine trained using a second set of video analytics data associated with the non-public-safety agency, a query to confirm whether the abnormal event detected by the first video analytics engine with respect to the person or object captured in the video stream is normal or abnormal within the operating environment of the non-public-safety agency; and reclassify the abnormal event as a normal event when a response from the second video analytics engine indicates that the abnormal event detected by the first video analytics engine is normal within the operating environment of the non-public-safety agency.

Another embodiment provides a method of collaboration between different agencies for classifying an event captured in a video stream. The method comprises: receiving, at an electronic computing device, a video stream captured by a camera operated by a first agency; analyzing, at the electronic computing device, the video stream using a first video analytics engine trained using a first set of video analytics data associated with the first agency; detecting, at the electronic computing device, an abnormal event with respect to a person or object captured in the video stream based on the analysis of the video stream using the first video analytics engine; determining, at the electronic computing device, that the video stream is captured corresponding to a location that is in proximity to an operating environment of a second agency; transmitting, at the electronic computing device, to a second video analytics engine trained using a second set of video analytics data associated with the second agency, a query to confirm whether the abnormal event detected by the first video analytics engine with respect to the person or object captured in the video stream is normal or abnormal within the operating environment of the second agency; and reclassifying the abnormal event as a normal event when a response from the second video analytics engine indicates that the abnormal event detected by the first video analytics engine is normal within the operating environment of the second agency.

Each of the above-mentioned embodiments will be discussed in more detail below, starting with example system and device architectures of the system in which the embodiments may be practiced, followed by an illustration of processing blocks for achieving an improved technical method of collaboration between different agencies for classifying an event captured in a video stream. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including a first electronic computing device 110, a first camera 120, and a first video analytics engine 130 each of which is associated with a first agency 140. The system 100 further includes a second electronic computing device 150, a second camera 160, and a second video analytics engine 170 each of which is associated with a second agency 180 that is different from the first agency 140. The first electronic computing device 110 is any computing device that is authorized by the first agency to collaborate, on behalf of the first agency, with one or more other agencies (e.g., second agency 180) for the purposes of classifying an event detected in a video stream captured by one or more cameras (e.g., first camera 120) that may be operated by personnel associated with the first agency 140. The first electronic computing device 110 collaborates with another agency, for example, the second agency 180, by communicating with one or more computing devices (e.g., a second electronic computing device 150 associated with the second agency 180) via one or more communication networks 190.

In accordance with some embodiments, the first agency 140 includes any public-safety agency (e.g., police, fire, emergency medical service etc.,) that is responsible for responding to a public-safety incident and/or patrolling an area (e.g., an area in which the second agency 180 conducts its operations) on foot, with a vehicle, or via remote surveillance systems (e.g., surveillance cameras, drones, or robots), and checking for any activity that might pose a threat to safety of people in the patrolled area. In these embodiments, the second agency 180 may represent a non-public-safety agency including a private enterprise or a facility such as a bank, airport, hotel, retail store etc., which conducts its businesses or operations in an area that is patrolled by and/or being responded to by the first agency 140. In one alternative embodiment, the first agency 140 is not a public-safety agency but another private enterprise or facility conducting its operations in the same premise (e.g., building) as the second agency 180. For example, the first agency 140 may be a bank and the second agency 180 may be a retail store, where both agencies share the same facility for conducting their operations. In another alternative embodiment, the first agency 140 and second agency 180 are both public-safety agencies conducting their respective operations in the same premise. In the above embodiments, the first agency 140 (whether a public-safety agency or a non-public-safety agency) may partially or fully share an operational area with the second agency 180 and further the first agency 140 may be responsible for or tasked with responding to an incident or patrolling an area that may overlap with the operating environment or area of the second agency 180. What should be understood is that the first and second agencies are different agencies operating independently (e.g., without being able to share data captured by one agency with another agency) from one another until a point when the first agency 140 initiates an execution of process in accordance with the embodiments described herein to collaborate with the second agency 180 for classifying an event captured in a video stream, for example, by the first camera 120 operated by the first agency.

The first camera 120 and second camera 160 are respectively operated by the first agency 140 and second agency 180 to capture video streams corresponding to a field of view of the respective video cameras 120, 160. Although FIG. 1 shows only one camera 120, 160 as being respectively associated with the first and second agencies 140, 180, the system 100 can include any number of fixed or portable video cameras that may be respectively deployed, operated, or maintained by the first and second agencies 140, 180 in any number of locations in which the first and second agencies 140, 180 conduct their operations. The first and second cameras 120, 160 may each include, but not limited to, surveillance cameras, vehicular cameras, body worn cameras, mobile cameras, drone cameras, and pocket cameras. As an example, the first agency 140 may employ one or more officers on foot or on vehicle to patrol an area that is within an operating environment of the second agency 180. In this example, the officers may operate cameras 120 such as drones, vehicular cameras, body worn cameras etc., to capture video streams corresponding to a patrolled area. Similarly, the second agency 180 may employ one or more fixed cameras such as surveillance cameras to monitor its operating environment. As used herein, the term "operating environment" refers to any indoor or outdoor space in which the second agency conducts its operations. In accordance with some embodiments, one or more video streams (or data representing an event detected from the video streams) captured by the first camera 120 operated by the first agency 140 is shared with the second agency 180 when there is a need for the first agency 140 to collaborate with the second agency 180 to classify and/or verify classification of an event captured in the video stream on the basis that the video stream is captured corresponding to a location that is in proximity to an operating environment of the second agency 180.

The first and second video analytics engines 130, 170 are each respectively associated with the first agency 140 and second agency 180 and may be implemented using computing devices selected from one or more of edge computing devices and cloud computing devices to run video analytics on video streams respectively captured by the first camera 120 and the second camera 160. For instance, when implemented at an edge computing device, the video analytics engines 130, 170 may be housed in the same premise (e.g., same building or facility), or otherwise coupled to the same communication network (e.g., a local area network), as the cameras 120, 160. Alternatively, the video analytics engines 130, 170 may be implemented on cloud computing devices that may comprise any number of computing devices and servers, and may include any type and number of resources, including resources that facilitate communications with and between servers, storage by the servers that are hosted remotely over one or more communication networks 190. In the example shown in FIG. 1, the first electronic computing device 110 may request the first video analytics engine 130 to analyze and report events of interest detected in video streams captured by the first camera 120. The second electronic computing device 150 may similarly request the second video analytics engine 170 to analyze and report events of interest detected in video streams captured by the second camera 160. In one embodiment, the second electronic computing device 150 forwards a video stream (e.g., a video stream captured by the first camera 140 associated with the first agency 140) received from the first electronic computing device to the second video analytics engine 170 to request the second video analytics engine 170 to confirm whether an event detected by the first video analytics engine 130 is normal or abnormal within the operating environment of the second agency 180.

The video analytics engines 130, 170 are each configured to receive video streams respectively captured by the cameras 120, 160 and analyze the video streams to determine properties or characteristics of the captured video streams and/or of persons, objects, or events found in the scene represented by the video streams. Based on the determinations made, the video analytics engines 130, 170 may further output metadata providing information about the determinations. Examples of determinations made by the video analytics engines 130, 170 may include person, object, or event detection, person, object, or event classification, anomaly detection, facial detection, facial recognition, license plate recognition, identification of objects left behind or removed, business intelligence, and the like. In accordance with embodiments, the video analytics engines 130, 170 may each include an event classifier to detect an event captured in the video stream respectively captured by the cameras 120, 160 to and further classify an event as one of a normal or abnormal event using one or more predefined rules. As an example, an event may be classified as an abnormal event when a person of interest (e.g., wanted suspect) is detected in a video stream captured at a scene. As another example, an event may be classified as an abnormal event when an object of interest (e.g., a vehicle displaying a particular license plate number) is detected in a video stream captured at a scene. As another example, an event may be classified as an abnormal event when one or more of the predefined set of events such as shot fired, vehicle collision, loitering, objects left behind, etc., are detected in a video stream captured at a scene.

In accordance with embodiments, the first and second video analytics engines 130, 170 are each respectively trained using a different set of data through machine learning. The machine learning for training the video analytics engines 130, 170 may be any appropriate machine learning technique known in the art, including, but not limited to, convolution neural networks, inductive logic programming, support vector machines, random forests, cascade classifiers, decision trees, bayesian networks, sparse dictionaries, and genetic algorithms. The first video analytics engine 130 is trained using a first set of video analytics data that is stored at a first database 135 maintained by the first agency. The first set of video analytics data includes any data that is captured, received, or extracted from data sources including the first camera 120 associated with the first agency 140. The first set of video analytics data is stored in the first database 135 in any suitable format or data type, for example, video, image, audio, text, or combination thereof. For example, the first set of video analytics data may include electronic records of reported incidents including pending incidents as well as incidents resolved by the first agency 140. The first set of video analytics data may also include an image or a video recorded by the first camera such as a body-worn camera, an audio (e.g., talk group conversations) recorded by a land mobile radio, text data (e.g., an incident report) entered by a dispatcher, and analytics data (e.g., events detected from previously captured video streams and further classified either as a normal event or an abnormal event) previously extracted by the first video analytics engine 130 based on processing video streams previously captured by one or more cameras including the first camera 120 operated by the first agency 140. The first set of video analytics data may also include information and resources such as vehicle histories, arrest records, outstanding warrants, health information, and other information that may aid public-safety agency personnel in making a more informed determination of whether an abnormal event has occurred in an area monitored or patrolled by the first agency 140. The first set of video analytics data may also include a set of video analytics rules. As an example, a video analytics rule may require an event captured in a video stream to be classified as an abnormal event if the event represents a person standing or waiting idly near a location of interest (e.g., bank) for longer than a specified time. As another example, a video analytics rule may require an event captured in a video stream to be classified as an abnormal event if the detected event includes a facial feature of a person that matches with a facial feature stored corresponding to a person with an outstanding warrant. As used herein, the term "abnormal event" may refer to any event of interest detected from a video stream, where the occurrence of the event requires an immediate action or response from the first agency.

The second video analytics engine 170 is trained using a second set of video analytics data stored at a second database 175 associated with the second agency 180. The second set of video analytics data includes any data that is captured, received, or extracted from data sources including the second camera 160 associated with the second agency 180. The second set of video analytics data is stored in the second database 135 in any suitable format or data type, for example, video, image, audio, text, or combination thereof. For example, the second set of video analytics data may include electronic records of reported incidents including pending incidents (e.g., security incidents such as theft or robbery) as well as incidents resolved by the second agency 180. The second set of video analytics data may also include an image or a video recorded by the second camera 160 such as a fixed surveillance camera, body-worn camera, enterprise data including employee, customer, visitor, and inventory data, and analytics data (e.g., events detected from previously captured video streams and further classified either as a normal event or an abnormal event) previously extracted by the second video analytics engine 170 based on processing video streams previously captured by one or more cameras including the second camera 160 operated by the second agency 180. The second set of video analytics data may also include a set of video analytics rules that may be different from the set of video analytics rules included in the first set of video analytics data. As an example, a video analytics rule associated with the second agency (e.g., non-public-safety agency) may require an event captured in a video stream by the second camera 160 operated by the second agency 180 to be classified as a normal event (even though the same event may be classified by the first agency as an abnormal event) if the event represents a person loitering in a location of interest, but the person is identified as an employee, visitor, customer, or another authorized personnel associated with the second agency. Accordingly, it is possible for the first agency 140 to classify an event captured in a video stream as an abnormal event on the basis that the event satisfies a set of video analytics rules included in a first set of video analytics data that is used for training the first video analytics engine 130 and the second agency 180 to classify the same event as a normal event on the basis that the event does not satisfy a set of video analytics rules included in the second set of video analytics data that is used for training the second video analytics engine 170. As used herein, the term "normal event" may refer to any event of interest detected from a video stream, where the occurrence of the event does not require an immediate public-safety action or response from the first or second agencies 140, 180.

Databases 135, 175 may each be implemented using any type of storage device, storage server, storage area network, redundant array of independent discs, cloud storage device, or any type of local or network-accessible data storage device configured to store data records for access by computing devices. In some embodiments, databases 135, 175 are implemented in commercial cloud-based storage devices. In some embodiments, the databases 135, 175 are housed on suitable on-premise database servers or edge computing devices that may be owned and/or operated by one or more of public-safety or private agencies. Databases 135, 175 may be maintained by third parties as well.

The communication network(s) 190 may include wireless and/or wired connections. For example, the communication network 190 may be implemented using a wide area network, such as the Internet, a local area network, such as a Wi-Fi network, and personal area or near-field networks, for example a Bluetooth™ network. Portions of the communications network may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

Figure 2:
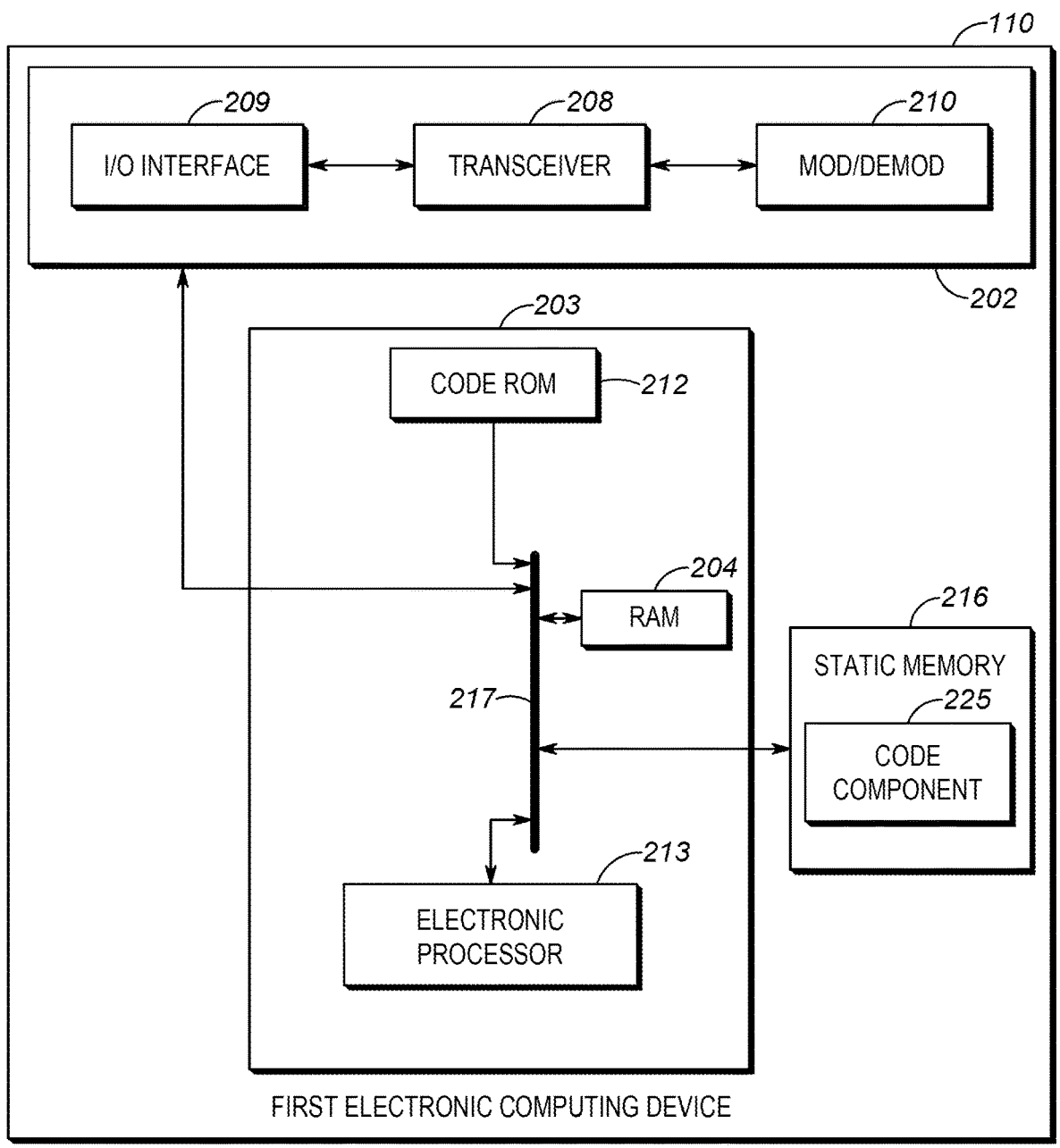
FIG. 2 is a block diagram of an electronic computing device shown in FIG. 1 in accordance with some embodiments.

FIG. 2 is an example functional block diagram of a first electronic computing device 110 operating within the system 100 in accordance with some embodiments. The first electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the first electronic computing device 110 can be implemented within one or more of the first camera 120 and first video analytics engine 130 shown in FIG. 1. While FIG. 2 represents a first electronic computing device 110 described above with respect to FIG. 1, the first electronic computing device 110 may include fewer or additional components in configurations different from that illustrated in FIG. 2.

As shown in FIG. 2, the first electronic computing device 110 includes a communications interface 202 coupled to a common data and address bus 217 of a processing unit 203. The communications interface 202 sends and receives data to and from other devices in the system 100. The communications interface 202 may include one or more wired and/or wireless input/output (I/O) interfaces 209 that are configurable to communicate with other devices in the system 100. For example, the communications interface 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications interface 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications interface 202.

Figure 3:
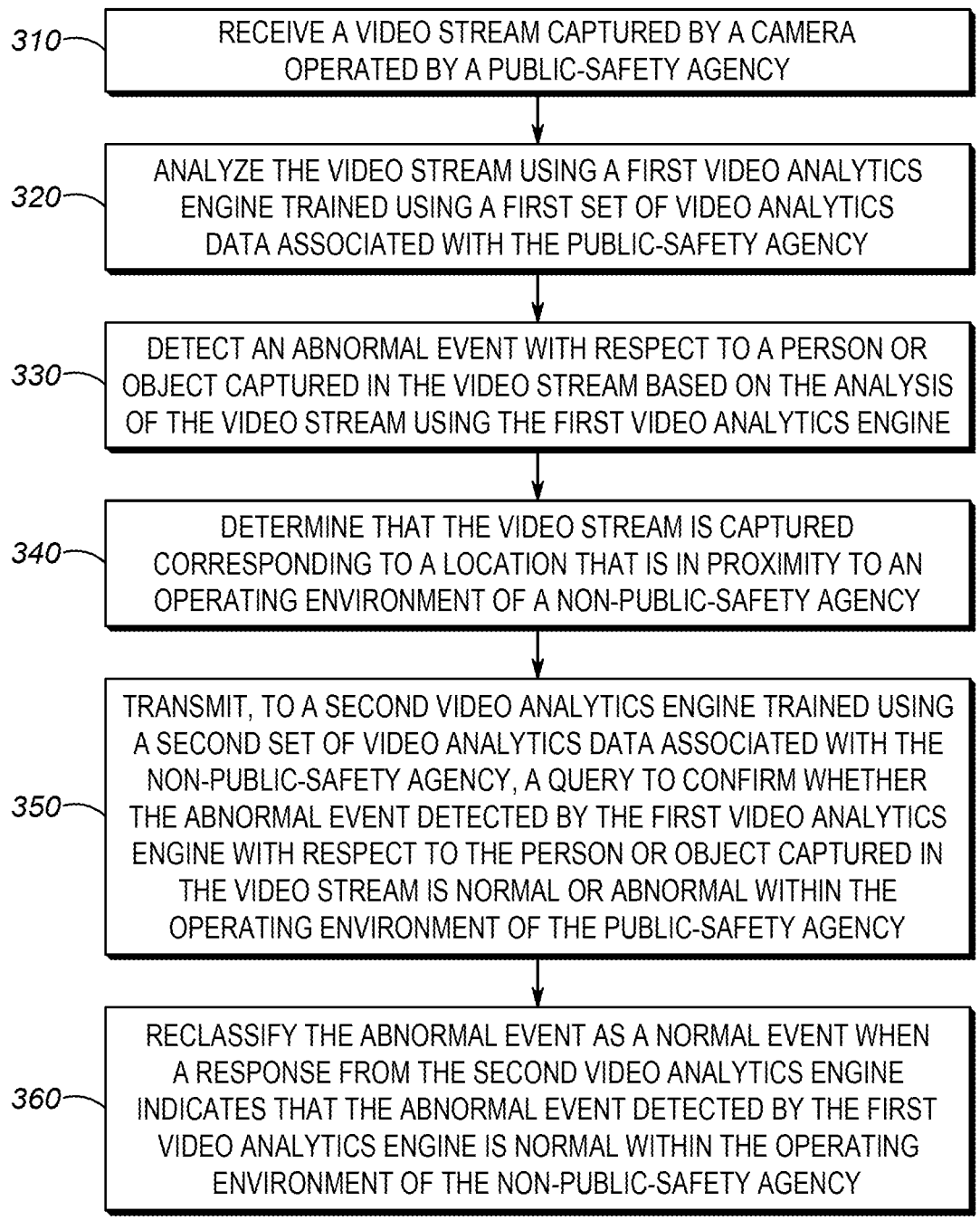
FIG. 3 illustrates a flowchart of a process for collaboration between different agencies for classifying an event captured in a video stream.

Static memory 216 may store operating code 225 for the electronic processor 213 that, when executed, performs one or more of the blocks set forth in FIG. 3, and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 may further store information required for the purpose of collaborating with a second agency 180 for classifying an event captured in a video stream by a first agency 140. As an example, the static memory 216 stores video streams captured by the first camera 120 and event description data (e.g., data indicating detection of an abnormal event with respect to a person or object captured in a video stream) extracted by the first video analytics engine 130 based on processing the video streams captured by the first camera 120.

In accordance with some embodiments, the second electronic computing device 150 associated with the second agency 180 is similarly implemented using one or more of the electronic components shown in FIG. 2. For example, the second electronic computing device 150 may include a communications interface including one or more wireless transceivers, a processing unit including an electronic processor and a memory including operating code, program, and instructions that, when executed by the electronic processor, enable the second electronic computing device 150 to perform a set of functions and operations described herein with reference to FIG. 3 and the accompanying text.

Turning now to FIG. 3, a flowchart diagram illustrates a process 300 for collaboration between different agencies (e.g., first and second agencies 140, 180) for classifying an event captured in a video stream. While FIG. 3 illustrates a process 300 by which a first agency 140, (e.g., a public-safety agency) collaborates with a second agency (e.g., a non-public safety agency) to classify an event captured in a video stream by a camera operated by the first agency, the process 300 could be similarly implemented for other forms of agencies that may need to collaboratively classify an event captured in a video stream. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A first electronic computing device 110 shown in FIG. 1 and/or FIG. 2, and embodied as a singular computing device or distributed computing device may execute process 300 via an electronic processor 213.

The first electronic computing device 110 may execute the process 300 at power-on, at some predetermined periodic time period thereafter, in response to a trigger raised locally at the electronic computing device 110 via an internal process or via an input interface or in response to a trigger from an external device (e.g., an officer patrolling an area on behalf of the first agency 140 or the public-safety agency may use a portable radio to request the first electronic computing device 110 to initiate the process 300) to which the first electronic computing device 110 is communicably coupled, among other possibilities.

Figure 4A:
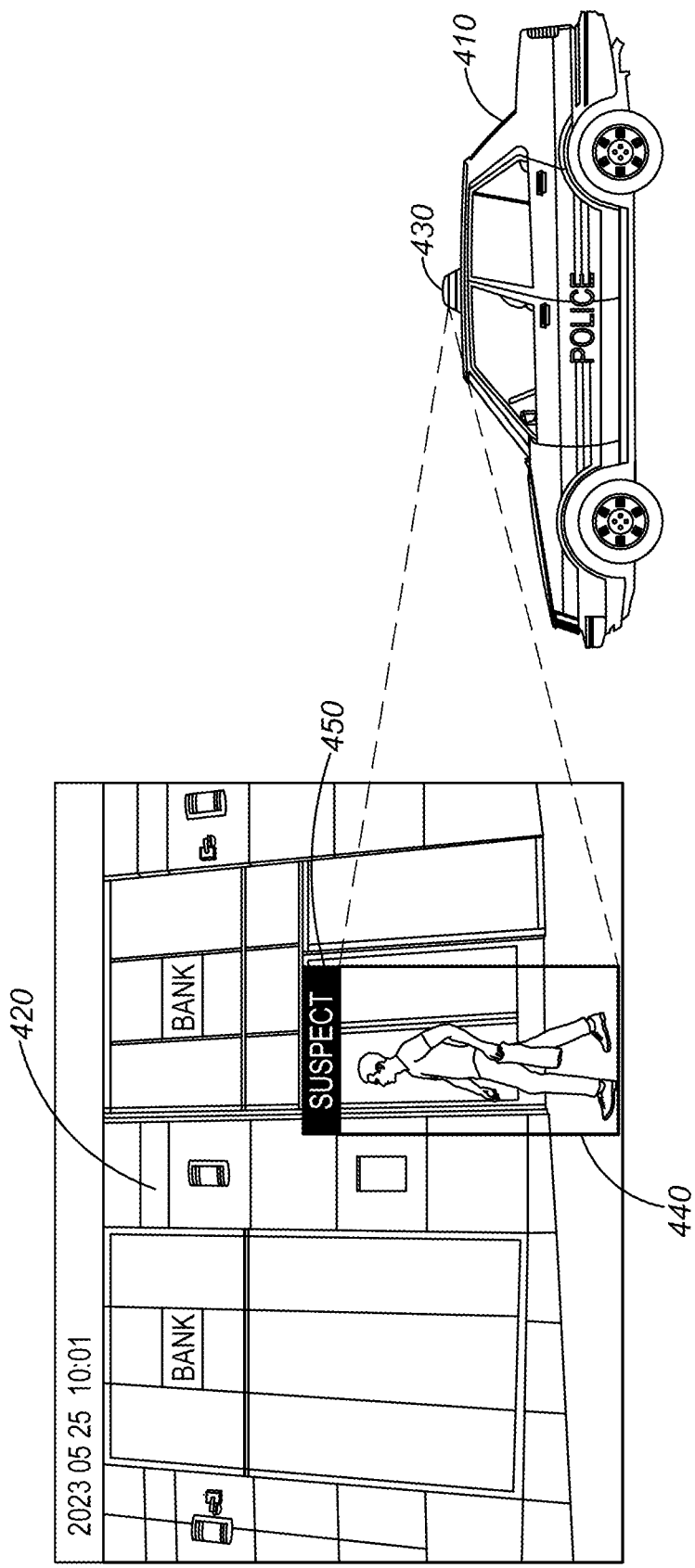
FIGS. 4A-4C illustrate an example scenario in which the embodiments described herein can be advantageously implemented to classify an event captured in a video stream.
Figure 4B:
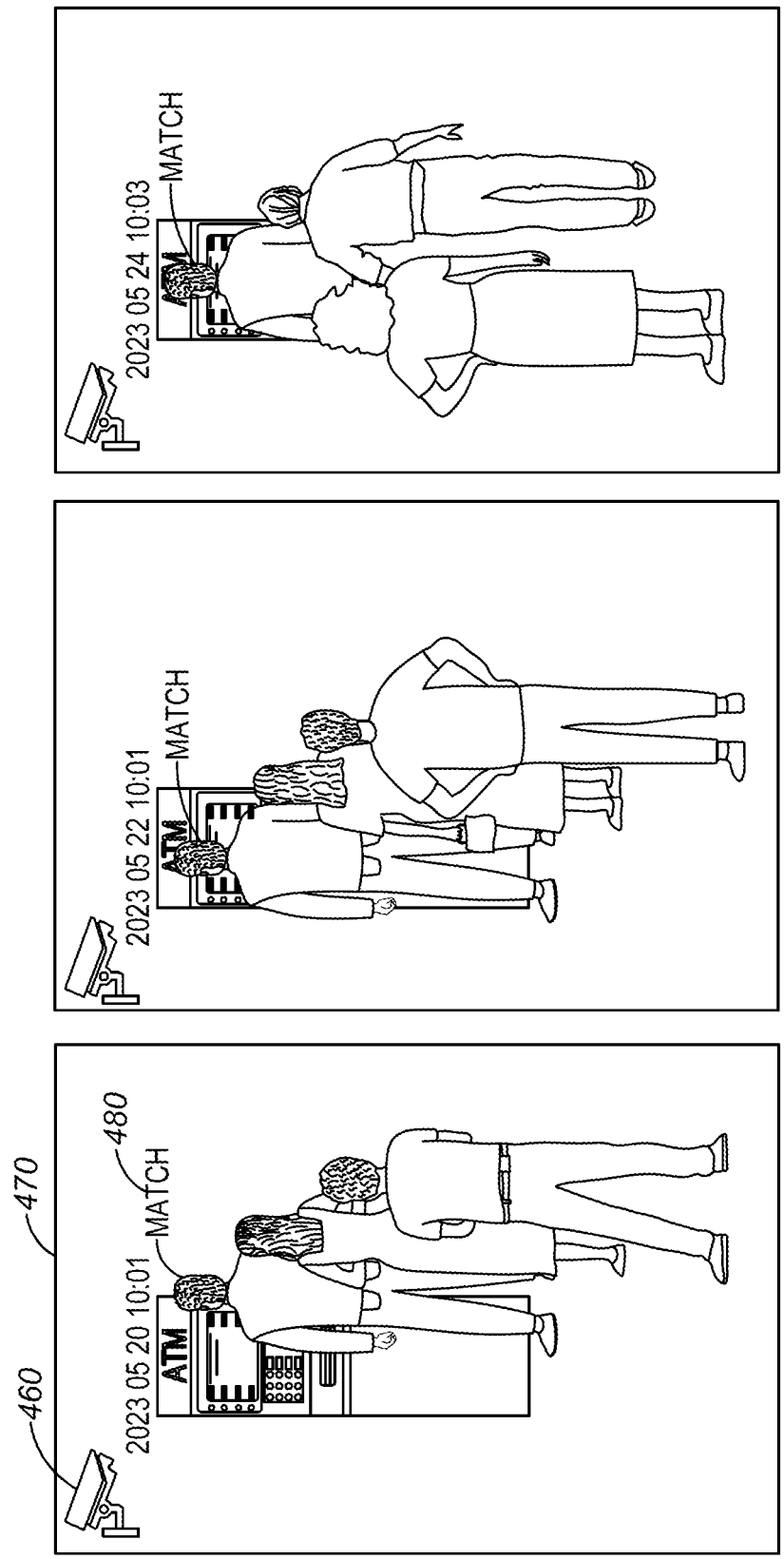

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well. The process 300 is also further described herein with reference to FIGS. 4A-4C. FIG. 4A

At block 310, the first electronic computing device 110 receives a video stream captured by a camera 120 operated by a first agency 140 such as a public-safety agency. In the example illustrated in FIG. 4A, a vehicle 410 has been dispatched by a public-safety agency to patrol an area in which a non-public-safety agency, for example, a bank 420 is located. A camera 430 is mounted to the vehicle 410 for capturing video streams corresponding to an area patrolled by the vehicle 410. The camera 430 is configured to transmit video stream(s) captured by the camera 430 to a computing device, for example, the first electronic computing device 110. The first electronic computing device 110 may store the received video stream(s) in the static memory 216 for further processing.

At block 320, the first electronic computing device 110 analyzes the video stream using a first video analytics engine 130 that is trained using a first set of video analytics data associated with the public-safety agency. For example, the first set of video analytics data includes any data stored in the database 135 maintained by the public-safety agency 140 and further accessible to the first video analytics engine 130 associated with the public-safety agency. In the example shown in FIG. 4A, since the first video analytics engine 130 associated with the public-safety agency does not have access to data maintained by the non-public-safety agency (i.e., bank 420), an event classifier implemented at the first video analytics engine 130 is trained using only the first set of video analytics data or in other words data that was previously captured or received from data sources (e.g., first camera 120) associated with the public-safety agency. Accordingly, in this example, the video stream(s) captured by the camera 430 are analyzed using a video analytics engine that is trained using video analytics data maintained by the public-safety agency.

At block 330, the first electronic computing device 110 detects an abnormal event with respect to a person or object captured in the video stream based on the analysis of the video stream using the first video analytics engine 130. In the example shown in FIG. 4A, the first video analytics engine 130 associated with the public-safety agency detects a person 440 appearing in the video stream captured by the camera 430. The first video analytics engine 130 may further detect, from the video stream, an event indicating that the person 440 is loitering near the bank 420. Since the first video analytics engine 130 is trained using a first set of video analytics data associated with the public-safety agency and stored at the first database 135, the first video analytics engine 130 may classify the event as an abnormal event on the basis that the detected event satisfies a first set of video analytics rules included in the first set of video analytics data. As an example, the first set of video analytics rules may be satisfied by the detected event if the person 440 is loitering near a location of interest such as the bank 420 for longer than a time period specified by the first set of video analytics rules. The first video analytics engine 130 may also further classify the person 440 as a suspect 450 if the first set of video analytics data include an incident record indicating that the person 440 was identified as a suspect in a bank robbery incident.

At block 340, the first electronic computing device 110 determines whether the video stream received at block 310 is captured corresponding to a location that is in proximity to an operating environment of a non-public-safety agency. In accordance with some embodiments, the electronic computing device 110 may access metadata associated with the video stream to extract a location (e.g., street address, coordinates, landmark etc.,) of a scene captured in the video stream. The first electronic computing device 110 may also store information corresponding to a list of non-public-safety agencies (e.g., bank, retail store etc.,) for which the public-safety agency (e.g., police) has permission to collaborate and classify an event captured in a video stream by a camera operated by the public-safety agency. The information stored corresponding to each non-public-safety agency may include, but not limited to, name or identifier of the non-public-safety agency, contact information (e.g., resource address for the second electronic computing device 150 which is authorized to collaborate on behalf of the non-public-safety agency), and location(s) in which the non-public-safety agency conducts its operations. As an example, if the location extracted from the video stream is in within a predefined distance (e.g., 50 meters) from a location of any of the non-public-safety agencies included in the list, then the first electronic computing device 110 determines that the video stream is captured corresponding to a location that is in proximity to an operating environment of a non-public-safety agency.

In accordance with some embodiments, when an event captured in a video stream is classified as an abnormal event, the first electronic computing device 110 refrains from sending an immediate alert, for example, to an officer in the patrolling vehicle 410 indicating the occurrence of the abnormal event in a patrolled area when the first electronic computing device 110 determines that the event included in the video stream is captured corresponding to a location that is in proximity to an operating environment of a non-public-safety agency (e.g., bank 420) and further where the first electronic computing device 110 has permission to collaborate with the non-public-safety agency to confirm if the event is accurately classified as an abnormal event by the first video analytics engine 130 associated with the public-safety agency. On the other hand, in these embodiments, if the first electronic computing device 110 determines that the public-safety agency does not have permission to collaborate with a non-public-safety agency or if the video stream including an event classified as an abnormal event is not captured in a location that is in proximity to any of the non-public-safety agencies included in the list, then the electronic computing device 110 instead proceeds to send an immediate alert, for example, to one or more officers in the vehicle 410 patrolling the location (e.g., bank building) corresponding to which the video stream is captured.

At block 350, the first electronic computing device 110 transmits, to a second video analytics engine 170 trained using a second set of video analytics data associated with the non-public-safety agency, a query to confirm whether the abnormal event detected by the first video analytics engine 130 with respect to the person or object captured in the video stream is normal within the operating environment of the public-safety agency. In one embodiment, the first electronic computing device 110 may determine that the video stream representing the event is captured at a location in proximity to operating environments of multiple non-public-safety agencies. In this embodiment, the first electronic computing device 110 transmits the query to multiple video analytics engines each respectively associated with one of the multiple non-public-safety agencies. The first electronic computing device 110 may transmit the query to the second video analytics engine 170 via the second electronic computing device 150 which is authorized to collaborate with the public-safety agency on behalf of the non-public-safety agency. In one embodiment, the query includes a unique identifier representing the query and a copy of the video stream capturing the event classified as an abnormal event. The query may alternatively include a resource address identifying a location at which the video stream is stored. In another embodiment, the query does not include the video stream itself, but instead includes event data in the form of an image or text describing the event (e.g., location, time, type of event) and corresponding person or object detected from the video stream.

In accordance with some embodiments, the first electronic computing device 110 executes block 350 to collaborate with the non-public-safety agency only when the first electronic computing device 110 determines that the public-safety agency has permission to collaborate with the non-public-safety agency. As described previously, the electronic computing device 110 may maintain a list of non-public-safety agencies with which the public-safety agency can collaborate for the purposes of classifying an event detected in a video stream captured by a camera operated by the public-safety agency. In accordance with some embodiments, the first electronic computing device 110 may further maintain information indicating whether or not each nonpublic-safety agency included in the list is associated with a trusted video analytics engine. In these embodiments, the first electronic computing device 110 collaborates with a non-public-safety agency (i.e., by transmitting a query at block 350) only when the non-public-safety agency is associated with a trusted video analytics engine (e.g., second video analytics engine 170).

At block 360, the first electronic computing device 110 reclassifies the abnormal event as a normal event when a response from the second video analytics engine 170 indicates that the abnormal event detected by the first video analytics engine 130 is normal within the operating environment of the non-public-safety agency. The second video analytics engine 170 may transmit the response to the first electronic computing device 110 via the second electronic computing device 150. The response may include the unique identifier included in the query received from the first electronic computing device 110 as well as information indicating whether the event detected by the first video analytics engine 130 is normal or abnormal within the operating environment of the non-public-safety agency.

In accordance with embodiments, the second video analytics engine 170 independently processes information included in the query received from the first electronic computing device 110 using a second set of video analytics data (e.g., data stored at the second database 175) prior to transmitting a response to the query indicating whether the event detected by the first video analytics engine 130 is normal or abnormal within the operating environment of the non-public-safety agency. In the example shown in FIGS. 4A-4C, the non-public-safety agency (i.e., bank 420) may receive a query from the public-safety agency with a request to confirm whether the loitering event captured corresponding to the person 440 is normal or abnormal within the operating environment of the non-public-safety agency. In response, the non-public-safety agency may use the second video analytics engine 170 to process the video stream and/or event data captured corresponding to the loitering event. The second video analytics engine 170 which is trained using the second video analytics data may determine that the loitering event captured corresponding to the person 440 is a normal event within the operating environment of the non-public-safety agency. For example, the second video analytics data includes data indicating that it is common for persons to wait for taxis for a longer period of time (e.g., a time that is typically longer than a threshold time required for an event to be classified as a loitering event by the public-safety agency) in certain areas outside the bank building.

In one embodiment, the second video analytics engine 170 processes the query received from the first electronic computing device 110 to extract information, for example, regarding a time and a location at which the person or object was captured in the video stream from which the event classified as an abnormal event was detected by the first video analytics engine 130. The second video analytics engine 170 accesses a second set of video analytics data that may include one or more video streams independently captured by cameras (e.g., second camera 160) operated by the non-public-safety agency based at least in part on the information regarding the time and the location at which the person or object was captured in the video stream representing the event classified as the abnormal event. The second video analytics engine 170 then analyzes the one or more video streams captured by cameras operated by the non-public-safety agency to determine if the abnormal event detected by the first video analytics engine 130 is normal within the operating environment of the non-public-safety agency. For instance, the non-public-safety agency may process video streams (i.e., not including the video stream captured by the public-safety agency) captured by cameras operated by the non-public-safety agency to verify if the loitering event as classified by the public-safety agency is normal or abnormal within the operating environment of the non-public-safety agency. In the example shown in FIG. 4B, the non-public-safety agency or the bank 420 operates its own cameras, for example, a surveillance camera 460 to monitor an operating environment (e.g., which may include an area 470 where an automated teller machine (ATM) associated with the bank 420 is provided). In this example, the second video analytics engine 170 processes video streams (e.g., selected based on location, time, or other event data included in the query received from the public-safety-agency) captured by the surveillance camera 460 and further determines that the features (e.g., face recognition data) of the person 440 (see FIG. 4A) match 480 with features of a person who regularly visited the bank and used the ATM. The second video analytics engine 170 then transmits a response, for example, via the second electronic computing device 150, to the first electronic computing device 110, to indicate that the abnormal event detected by the first video analytics engine 130 is normal within the operating environment of the non-public-safety agency.

In another embodiment, the second video analytics engine 170 processes the query received from the first electronic computing device 110 to extract information regarding an identity of the person or object captured in the video stream from which the event classified as an abnormal event was detected by the first video analytics engine 130. The second video analytics engine 170 accesses a second set of video analytics data that may include one or more records (e.g., customer records of the bank 420) maintained by the non-public-safety agency corresponding to the identity of the person or object captured in the video stream. The second video analytics engine 170 then analyzes the second set of video analytics data including the one or more records maintained corresponding to the person or object detected in the video stream to determine if the abnormal event detected by the first video analytics engine 130 is normal within the operating environment of the non-public-safety agency. In the example shown in FIGS. 4A-4C, the second video analytics engine 170 may correlate identity information (e.g., person's face recognition data) received corresponding to the person 440 involved in the loitering event with customer records maintained by the bank 420 to determine whether the person 440 involved in the loitering event is also a customer of the bank. The second video analytics engine 170 then makes a determination that the loitering event included in the query received from the public-safety agency is a normal event within the operating environment of the non-public-safety agency (e.g., bank 420) based on one or more records indicating that the person 440 involved in the loitering event (as classified by the public-safety agency) is a customer of the non-public-safety agency. The second video analytics engine 170 then transmits a response, for example, via the second electronic computing device 150, to the first electronic computing device 110, to indicate that the abnormal event detected by the first video analytics engine 130 is normal within the operating environment of the non-public-safety agency.

In another embodiment, the second video analytics engine 170 compares a queried event (i.e., an event classified as an abnormal event and further detected with respect to a person or object captured in a video stream by a camera operated by the public-safety agency) with a set of video analytics rules included in the second set of video analytics data maintained by the non-public-safety agency. As an example, in the example illustrated in FIGS. 4A-4C, a video analytics rule defined by the non-public-safety agency may specify an amount of time that a person needs to spend at a given location in order for an event to be classified as a loitering event or abnormal event. In this example, the second video analytics engine processes the video stream and/or event data received from the public-safety agency and determines that the event captured corresponding to the person 440 does not satisfy the video analytics rule on the basis that the person 440 did not spend the minimum amount of time required by the second video analytics rule in order for the event to be classified as the loitering event or abnormal event. Accordingly, the second video analytics engine 170 provides a response indicating that the abnormal event detected by the first video analytics engine 130 is normal within the operating environment of the non-public-safety agency when the event does not satisfy a set of video analytics rules included in the second set of video analytics data maintained by the non-public-safety agency.

In another embodiment, the second set of video analytics data may include a past event (e.g., a customer waiting for a taxi near the bank for a duration of time) with respect to a person or object captured in a video stream, where the past event was classified as a normal event by the non-public-safety agency. In this embodiment, the second video analytics engine 170 correlates the queried event (i.e., loitering event) with the past event and further provides a response indicating that the abnormal event detected by the first video analytics engine 130 is normal within the operating environment of the non-public-safety agency when there is a threshold level of correlation between the event and the past event. As an example, a threshold level of correlation may exist between a queried event and the past event when the person involved in the queried event is the same as the customer identified in the past event.

Figure 4C:
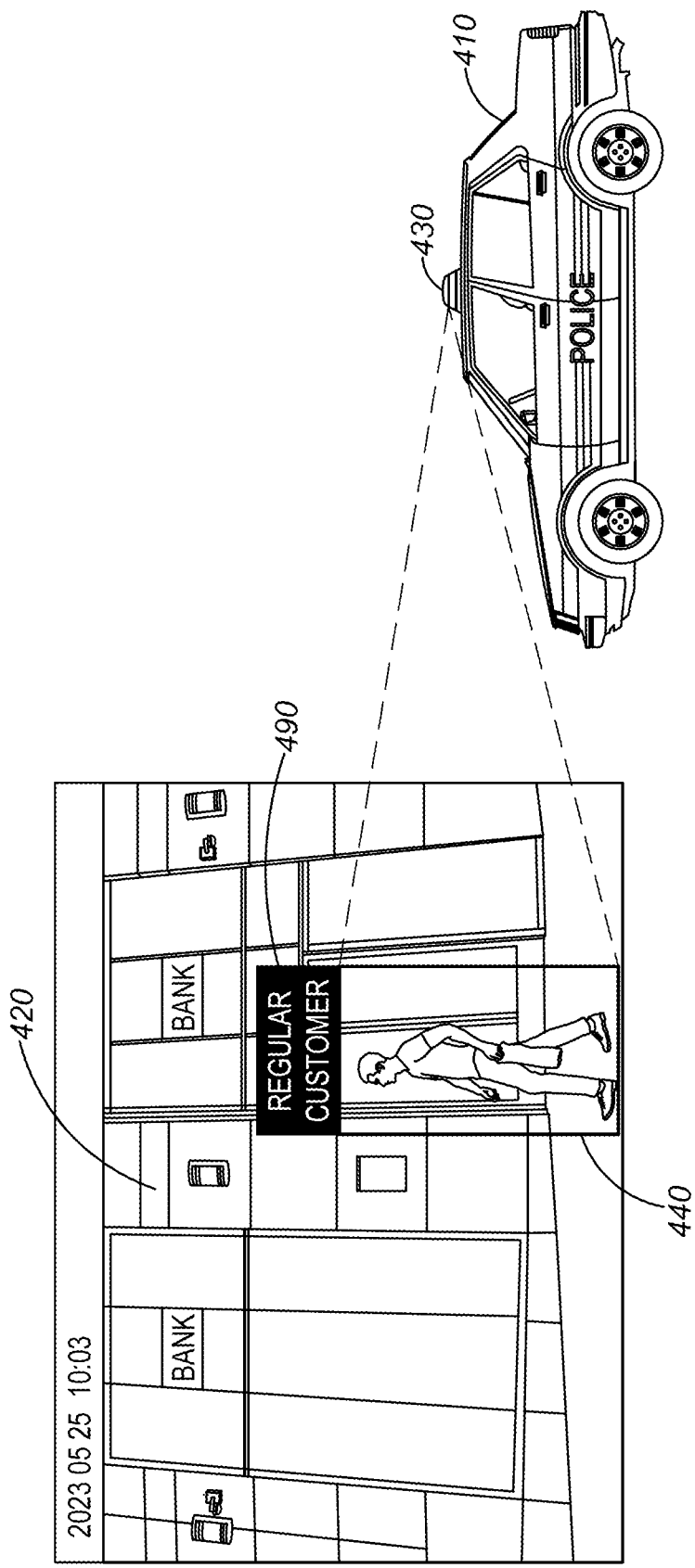

In any case, after determining that the event captured by the public-safety agency is a normal event, the second video analytics engine 170 generates a response indicating that the loitering event detected by the public-safety agency with respect to a person 440 is a normal event within the operating environment of the non-public-safety agency. The response may additionally include data (e.g., determined based on analyzing the event using the second set of video analytics data) that were used to determine that the queried event is a normal event. For example, as shown in FIG. 4C, the response may include data indicating that the person 440 involved in the loitering event is a regular customer 490 of the bank 420. As another example, the response may include data indicating that it is common for persons to wait for taxis near the bank for longer durations of time. In these embodiments, the second video analytics engine 170 may transmit the response to the first electronic computing device 110 via the second electronic computing device 150.

Returning to block 360, when the first electronic computing device 110 receives a response from the second video analytics engine 170, the first electronic computing device 110 processes information included in the response received from the second video analytics engine 170 to determine whether the response indicates that the non-public-safety agency has classified the event differently. If the response indicates that the non-public-safety agency has confirmed that the abnormal event detected by the first video analytics engine 130 is also abnormal within the operating environment of the non-public-safety agency, then the first electronic computing device 110 maintains the classification of the event as an abnormal event, for example, by storing metadata corresponding to the video stream to indicate that the non-public-safety agency has confirmed that the event is an abnormal event. In this case, the first electronic computing device 110 further sends an alert to officers associated with the public-safety agency to respond to the detected event. On the other hand, if the response indicates that the non-public-safety agency has classified the abnormal event as a normal event, then the first electronic computing device 110 reclassifies the event. In the example shown in FIG. 4, the first electronic computing device 110 reclassifies the loitering event as a normal event on the basis of the response received from the second video analytics engine 170 associated with the non-public-safety agency. In one embodiment, when an event is reclassified as a normal event, the first electronic computing device 110 refrains from sending an alert indicating the detection of the event to one or more public-safety officers associated with the public-safety agency. In another embodiment where the first electronic computing device 110 previously notified the public-safety officers about detection of an abnormal event, the first electronic computing device 110 may send a second notification indicating that the event previously classified as the abnormal event has been reclassified as a normal event (and that no public-safety response is required for the event) based on collaboration with a non-public-safety agency. The first electronic computing device 110 may also further update metadata stored corresponding to the video stream containing the detected event to reflect the reclassification of the event as a normal event. In accordance with embodiments, a video stream capturing the event may be automatically deleted from records as soon as (or after an assigned retention period) the event is classified as a normal event. Further, in these embodiments, the first video analytics engine 130 associated with the public-safety agency is automatically retrained based on the response received from the second video analytics engine 170 indicating that the abnormal event detected by the first video analytics engine 130 is normal within the operating environment of the non-public-safety agency.

In one embodiment, the second set of video analytics data may not include sufficient data (e.g., when portions of data maintained by the non-public-safety agency are restricted for privacy reasons) for the second video analytics engine 170 to make a determination on whether the queried event (i.e., an event classified as an abnormal event by the public-safety agency) is normal or abnormal. For example, referring to FIG. 4, the second video analytics engine 170 may not have access to customer records maintained by the bank 420 or video stream captured by certain cameras (e.g., surveillance camera 460 deployed near the ATM) deployed near the bank 420. In this example, the second video analytics engine 170 is not able to automatically verify whether the person involved in the loitering event is a regular customer or not and therefore further cannot automatically confirm if the abnormal event classified by the public-safety agency is normal or abnormal within the operating environment of the bank. In this embodiment, the second video analytics engine 170 generates a response indicating that the non-public-safety agency is unable to confirm whether the abnormal event detected by the first video analytics engine 130 is normal or abnormal within the operating environment of the non-public-safety agency. When the first electronic computing device 110 associated with the public-safety agency receives the response from the non-public-safety agency indicating that the non-publicsafety agency is unable to confirm the event as a normal or abnormal event, the first electronic computing device 110 maintains the classification of the event as an abnormal event and may further send an alert to officers to respond to the detected event.

While the embodiments described herein describes a process for reclassifying an abnormal event as a normal event, the embodiments can be readily modified to achieve a process of collaboration between two agencies for reclassifying a normal event as an abnormal event. For example, assume the first electronic computing device 110, operating on behalf of the first agency 140, classifies an event detected in a video stream captured by the first camera 120 operated by the first agency as a normal event based on the analysis of the video stream using the first video analytics engine 130 trained using a first set of video analytics data associated with the public-safety agency. Further assume that the video stream is captured corresponding to a location that is in proximity to an operating environment of the second agency 180. In this case, the first agency 140 can collaborate with the second agency 180 to verify if the normal event detected by the first agency 140 is to be reclassified as an abnormal event based on data maintained by the second agency 180, but not accessible to the first agency 140. For example, the first electronic computing device 110 transmits a request to a second video analytics engine 170 which is trained using the second set of video analytics data maintained by the second agency 180 to confirm whether the normal event detected by the first agency 140 is normal or abnormal within the operating environment of the second agency 180. If a response received from the second video analytics engine 170, for example, via the second electronic computing device 150, indicates that that the normal event detected by the first video analytics engine 130 is abnormal within the operating environment of the second agency 180, then the first electronic computing device 110 reclassifies the normal event as an abnormal event and further may immediately send an alert indicating the detection of the abnormal event to one or officers authorized to respond to the abnormal event on behalf of the first agency 140. On the other hand, if the response indicates that the normal event detected by the first video analytics engine 130 is also classified as a normal event within the operating environment of the second agency 180, then the first electronic computing device 110 refrains from sending any alert indicating the detection of the event.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of collaboration between different agencies for classifying an event captured in a video stream, the method comprising:

receiving, at an electronic computing device, a video stream captured by a camera operated by a public-safety agency;

analyzing, at the electronic computing device, the video stream using a first video analytics engine trained using a first set of video analytics data associated with the public-safety agency;

detecting, at the electronic computing device, an abnormal event with respect to a person or object captured in the video stream based on the analysis of the video stream using the first video analytics engine;

determining, at the electronic computing device, that the video stream is captured corresponding to a location that is in proximity to an operating environment of a non-public-safety agency;

transmitting, at the electronic computing device, to a second video analytics engine trained using a second set of video analytics data associated with the non-public-safety agency, a query to confirm whether the abnormal event detected by the first video analytics engine with respect to the person or object captured in the video stream is normal or abnormal within the operating environment of the non-public-safety agency; and reclassifying the abnormal event as a normal event when a response from the second video analytics engine indicates that the abnormal event detected by the first video analytics engine is normal within the operating environment of the non-public-safety agency.

2. The method of claim 1, further comprising:
in response to receiving the response from the second video analytics engine, refraining from sending an alert indicating the detection of the abnormal event to an officer associated with the public-safety agency.

3. The method of claim 1, further comprising:
retraining the first video analytics engine based on the response received from the second video analytics engine indicating that the abnormal event detected by the first video analytics engine is normal within the operating environment of the non-public-safety agency.

4. The method of claim 1, wherein prior to transmitting, the method further comprising:
verifying that the second video analytics engine associated with the non-public-safety agency is a trusted video analytics engine.

5. The method of claim 1, wherein the query comprises the video stream or a resource address from which the video stream can be accessed by the second video analytics engine.

6. The method of claim 1, wherein the first set of video analytics data includes a first set of video analytics rules, the method comprising:
detecting, using the first video analytics engine, an event with respect to the person or object captured in the video stream; and
classifying, using the first video analytics engine, the event as the abnormal event when the event satisfies the first set of video analytics rules.

7. The method of claim 1, wherein the second set of video analytics data includes a second set of video analytics rules, the method comprising:
comparing, using the second video analytics engine, the event detected with respect to the person or object captured in the video stream with the second set of video analytics rules; and
providing the response indicating that the abnormal event detected by the first video analytics engine is normal within the operating environment of the non-publicsafety agency when the event does not satisfy the second set of video analytics rules.

8. The method of claim 1, wherein the first set of video analytics data includes a past event detected with respect to the person or object captured in the video stream and further where the past event is classified as an abnormal event, the method comprising:
    detecting, using the first video analytics engine, an event with respect to the person or object captured in the video stream;
    correlating, using the first video analytics engine, the event with the past event; and
    classifying the event as the abnormal event when there is a threshold level of correlation between the event and the past event.

9. The method of claim 1, wherein the second set of video analytics data includes a past event detected with respect to the person or object captured in the video stream and further where the past event is classified as a normal event, the method comprising:
    correlating, using the second video analytics engine, the event detected with respect to the person or object captured in the video stream with the past event; and
    providing the response indicating that the abnormal event detected by the first video analytics engine is normal within the operating environment of the non-public-safety agency when there is a threshold level of correlation between the event and the past event.

10. The method of claim 1, further comprising:
    processing, using the second video analytics engine, the query received from the electronic computing device to extract information regarding a time and the location at which the person or object was captured in the video stream;
    accessing, using the second video analytics engine, the second set of video analytics data including at least one other video stream captured by at least one other camera operated by the non-public-safety agency based at least in part on the information regarding the time and the location at which the person or object was captured in the video stream; and
    analyzing, using the second video analytics engine, the second set of video analytics data including the at least one other video stream prior to providing the response indicating that the abnormal event detected by the first video analytics engine is normal within the operating environment of the non-public-safety agency.

11. The method of claim 1, wherein analyzing further comprises:
    processing, using the second video analytics engine, the query received from the electronic computing device to extract information regarding an identity of the person or object captured in the video stream;
    accessing, using the second video analytics engine, the second set of video analytics data including one or more records maintained by the non-public-safety agency corresponding to the identity of the person or object captured in the video stream; and
    analyzing, at the second video analytics engine, the second set of video analytics data including the one or more records maintained corresponding to the person or object detected in the video stream prior to providing the response indicating that the abnormal event detected by the first video analytics engine is normal within the operating environment of the non-public-safety agency.

12. The method of claim 1, further comprising:
    providing an alert to an officer associated with the public-safety agency when a response from the second video analytics engine indicates that the abnormal event detected by the first video analytics engine is abnormal within the operating environment of the non-public-safety agency.

13. An electronic computing device, comprising:
    a communications interface; and
    an electronic processor communicatively coupled to the communications interface, the electronic processor configured to:
        receive, via the communications interface, a video stream captured by a camera operated by a public-safety agency;
        analyze the video stream using a first video analytics engine trained using a first set of video analytics data associated with the public-safety agency;
        detect an abnormal event with respect to a person or object captured in the video stream based on the analysis of the video stream using the first video analytics engine;
        determine that the video stream is captured corresponding to a location that is in proximity to an operating environment of a non-public-safety agency;
        transmit, via the communications interface, to a second video analytics engine trained using a second set of video analytics data associated with the non-public-safety agency, a query to confirm whether the abnormal event detected by the first video analytics engine with respect to the person or object captured in the video stream is normal or abnormal within the operating environment of the non-public-safety agency; and
        reclassify the abnormal event as a normal event when a response from the second video analytics engine indicates that the abnormal event detected by the first video analytics engine is normal within the operating environment of the non-public-safety agency.

14. The electronic computing device of claim 13, wherein the electronic processor is configured to refrain from sending an alert indicating the detection of the abnormal event to an officer associated with the public-safety agency in response to receiving the response from the second video analytics engine.

15. The electronic computing device of claim 13, wherein the electronic processor is configured to retrain the first video analytics engine based on the response received from the second video analytics engine indicating that the abnormal event detected by the first video analytics engine is normal within the operating environment of the non-public-safety agency.

16. The electronic computing device of claim 13, wherein the electronic processor is configured to:
    detect, using the first video analytics engine, an event with respect to the person or object captured in the video stream; and
    classify, using the first video analytics engine, the event as the abnormal event when the event satisfies a first set of video analytics rules included in the first set of video analytics data.

17. The electronic computing device of claim 13, wherein the first set of video analytics data includes a past event detected with respect to the person or object captured in the video stream and further where the past event is classified as an abnormal event, wherein the electronic processor is configured to:

detect, using the first video analytics engine, an event with respect to the person or object captured in the video stream;

correlate, using the first video analytics engine, the event with a past event; and classify the event as the abnormal event when there is a threshold level of correlation between the event and the past event.

18. The electronic computing device of claim 13, wherein the electronic processor is configured to:

provide, via the communications interface, an alert to an officer associated with the public-safety agency when a response from the second video analytics engine indicates that the abnormal event detected by the first video analytics engine is abnormal within the operating environment of the non-public-safety agency.

19. A method of collaboration between different agencies for classifying an event captured in a video stream, the method comprising:

receiving, at an electronic computing device, a video stream captured by a camera operated by a first agency;

analyzing, at the electronic computing device, the video stream using a first video analytics engine trained using a first set of video analytics data associated with the first agency;

detecting, at the electronic computing device, an abnormal event with respect to a person or object captured in the video stream based on the analysis of the video stream using the first video analytics engine;

determining, at the electronic computing device, that the video stream is captured corresponding to a location that is in proximity to an operating environment of a second agency;

transmitting, at the electronic computing device, to a second video analytics engine trained using a second set of video analytics data associated with the second agency, a query to confirm whether the abnormal event detected by the first video analytics engine with respect to the person or object captured in the video stream is normal or abnormal within the operating environment of the second agency; and reclassifying the abnormal event as a normal event when a response from the second video analytics engine indicates that the abnormal event detected by the first video analytics engine is normal within the operating environment of the second agency.

20. The method of claim 19, further comprising:

retraining the first video analytics engine based on the response received from the second video analytics engine indicating that the abnormal event detected by the first video analytics engine is normal within the operating environment of the second agency.

* * * * *